M. WALSER.
CUTTING TOOL FOR HIGH SPEED WORK.
APPLICATION FILED JUNE 2, 1914.
1,129,925.  Patented Mar. 2, 1915.
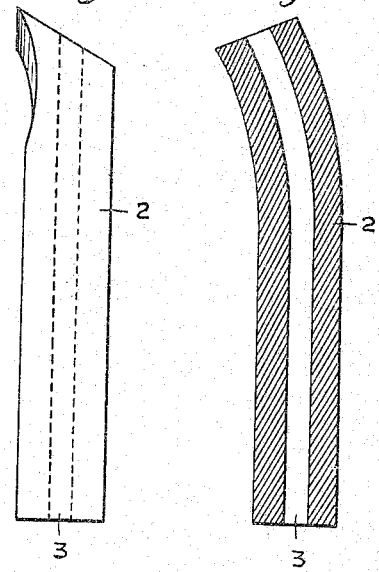
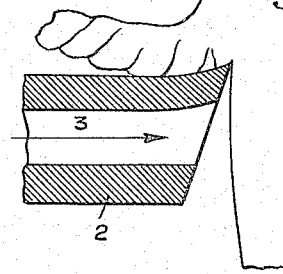
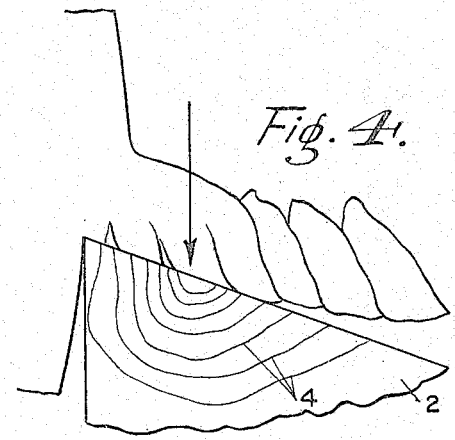
Witnesses:—
M. M. Border.
H. S. J. Dunbar Jr.
M. Walser.
Inventor.
By G. Croydon Marks.
Attorney.

UNITED STATES PATENT OFFICE.

MAX WALSER, OF SAMPIERDARENA, ITALY.

CUTTING-TOOL FOR HIGH-SPEED WORK.

1,129,925.  Specification of Letters Patent.  Patented Mar. 2, 1915.

Application filed June 2, 1914. Serial No. 842,539.

*To all whom it may concern:*

Be it known that I, MAX WALSER, citizen of Switzerland, residing at Via Andrea Costa 3, Sampierdarena, Italy, have invented certain new and useful Improvements in Cutting-Tools for High-Speed Work, of which the following is a specification.

The present invention refers to improvements in high speed tools for the purpose to obtain a higher cutting efficiency.

It is known that the cutting speed of a modern high speed tool is particularly determined by its "red hardness" that is to say by the resistance which the tool presents to the high temperatures produced through the working strains. The wear of a high speed tool expresses itself principally in two ways. First: In this that the edge of the tool on account of the working strains will be consumed when the heat in the tool will have reached a certain temperature. Second: In this that on the lip surface of the tool the steady continuous pressure and friction caused by the chip will produce grooves which contribute also to the wear of the tool.

The object of the present invention is to provide improved means for overcoming these objections and obtaining a more efficient tool.

Figure 1 shows an elevation and Fig. 2 a section of a tool constructed according to the invention. Figs. 3 and 4 show the tool in operation.

According to the present invention a longitudinal canal 3, of large cross sectional area as compared with the cross sectional area of the tool, is provided running throughout the whole length of the tool 2 so that the cooling liquid may be forced therethrough in the direction toward the cutting side, as shown by the arrow in Fig. 3, for the purpose of efficiently cooling the body of the tool and a free outlet for said liquid is provided.

In modern high speed tools a zone of heat is always created by the pressure and by the resulting friction with the chip as may be shown through the curves 4 of Fig. 4, the point of maximum pressure and heat being in the vicinity indicated by the arrow in Fig. 4. According to the present invention the mentioned conduit for the cooling liquid leads immediately across this heated range so as to effect in a steady and continuous manner the direct absorption of the greatest part of the produced heat. In this manner the accumulation of heat is prevented while with the present known cooling devices the heat is rapidly accumulating so as to reach a certain limit which puts the tool out of service and this within a short time of its starting.

The higher efficiency realized by the improvement of the present invention results in a higher cutting speed and in a longer cutting duration of a tool in comparison with one of the same material and working under the same conditions of service with an old style cooling device. A further advantage obtained by the improvements of the present invention, consists in the fact, that by the efficient cooling inside the heated zone of the tool, the tool will maintain for a relative long time such a low temperature so as to conserve its original hardness. The direct consequence of this fact is that the formation of grooves on the lip surface will be less likely to occur.

I claim:

A cutting tool for high speed work having a canal for the passage of cooling liquid, passing longitudinally through its interior, such canal being of a large cross sectional area as compared with the total cross sectional area of the tool and having a free outlet at the end of the tool, whereby a sufficient flow of cooling liquid may be obtained through the body of the tool itself to prevent overheating.

In testimony whereof I have affixed my signature in presence of two witnesses.

MAX WALSER.

Witnesses:
 NICOLA FISCHETTI,
 A. BORAGINO.